United States Patent [19]

Webber

[11] Patent Number: 4,663,513

[45] Date of Patent: May 5, 1987

[54] METHOD AND APPARATUS FOR MONITORING LASER PROCESSES

[75] Inventor: Tim Webber, Berkeley, Calif.

[73] Assignee: Spectra-Physics, Inc., San Jose, Calif.

[21] Appl. No.: 801,990

[22] Filed: Nov. 26, 1985

[51] Int. Cl.⁴ ............................................... B23K 26/00
[52] U.S. Cl. ........................... 219/121 L; 219/121 LC
[58] Field of Search ..... 219/121 L, 121 LM, 121 LC, 219/121 LD, 121 LG, 121 LN, 121 LH, 121 LJ, 121 LE, 121 LF

[56] References Cited

U.S. PATENT DOCUMENTS

| 3,848,101 | 11/1974 | Locke | 219/121 LA X |
| 3,952,180 | 4/1976 | Gnanamuth | 219/121 LD X |
| 4,121,087 | 10/1978 | Malmuth et al. | 219/121 LB |
| 4,151,014 | 4/1979 | Charschan | 219/121 LF X |
| 4,250,372 | 2/1981 | Tani | 219/121 LF X |
| 4,304,981 | 12/1981 | Gappa | 219/121 LB X |
| 4,316,467 | 2/1982 | Muckerheide | 219/121 LB X |
| 4,564,012 | 1/1986 | Shimada et al. | 219/121 LB X |

Primary Examiner—C. L. Albritton
Attorney, Agent, or Firm—Paul Davis

[57] ABSTRACT

A method and apparatus for monitoring and verifying laser processes detects infrared radiation along a laser process path at a point apart from and behind the point where the laser processing is actually occuring at a particular time. A window value of temperatures (proportional to detected infrared radiation) is determined and utilized to monitor the process. If the temperature profile corresponding to the detected infrared radiation is not within the window value a signal is generated which can trigger a different number of events.

3 Claims, 7 Drawing Figures

METHOD AND APPARATUS FOR MONITORING LASER PROCESSES

FIELD OF THE INVENTION

This invention relates generally to laser processes employing high-powered lasers and more particularly, to a method and apparatus for monitoring heat input at a point positioned away from where the process is occurring to ascertain whether the process has met predetermined specifications.

BACKGROUND OF THE INVENTION

Lasers have found widespread industrial applications in areas including but not limited to welding, cladding, transformation hardening, annealment, and the like. Laser material processing takes advantage of the ease at which the laser light can be optically configured, controlled and directed onto a material's surface.

Each laser process can be characterized by the power density used to perform the desired material modification. In laser welding a power density typically between $3 \times 10^6$ W/in$^2$ and $2 \times 10^7$ W/in$^2$ is used. When this power density is brought to a metal's surface a hole is formed, filled with metal vapor and plasma. This is known as a keyhole in this high energy welding field. With relative motion the keyhole is moved down the weld seam. With a given power density the rate of relative motion controls the depth of the keyhole and thus the depth of the weld.

Laser transformation hardening of steels generally requires a power density between 3 KW/in$^2$ and 32 KW/in$^2$. Typically this power density is transverse across the section to be hardened. A combination of travel speed and laser spot size produce a dwell time to which the steel is brought to a temperature above its phase transformation temperature to a specific depth without melting the surface. The relatively low temperature of the bulk material provides the rapid quench required to produce a case of high hardness. In a few instances there is insufficient bulk to meet the quench rate requirements of the material so a coolant must be used. An unmolten metal is a good reflector of $CO_2$ laser light so a coating is used to enhance the energy absorbtion.

Annealment with lasers requires a lower power density of about 3 KW/in$^2$ to 10 KW/in$^2$ and a coating is used for good power absorption. Benefits include high speed, selected areas of a workpiece can be annealed and low distortion is produced.

In a production environment it is possible for materials and part geometries to fall out of specification and machine tool components to deteriorate in performance or fail in use. Any of these can cause the process to go out of control resulting in a defective part. Statistical sampling of the processed parts is used to minimize the chance that a defective part continue through the system. To drive this chance to zero it becomes quite costly. It is of economic interest to develop systems to monitor processes on a part by part basis.

A real-time AE technique has been used to monitor laser beam welds, Jon, M. C. Welding Journal, 43, September 1985. This technique used a non-contacting sensor. A piezoelectric sensor was placed above the workpiece and monitored the pressure generated by the vaporization produced during laser welding. However, this AE method lacked sensitivity to noise immunity and output signal analysis and was generally limited in its practical applications.

Other methods and apparatus have been utilized in combination with non-laser welding operations for a variety of applications.

U.S. Pat. No. 4,532,404 noted that heat generated from a molten weld generated by an arc electrode was propagated as thermal waves through the bodies of respective metal pieces to be welded. Heat was generated in a radial manner and defined isothermal lines having progressively lowered values of temperature as the distance from the heating source increased. A pyrometer collected infrared rays emanating from the heated surfaces to define a temperature profile distribution at a time which reflected the real thermal dissipation condition prevailing ahead of the weld melt zone. A real time control system was used to adapt the operating characteristics of the welding electrode to environmental temperature variations or changes. The vertical position of the electrode was controlled in accordance with the monitored signals to compensate for vertical alignment. Other correction action such as displacement of the electrode over a colder edge or a tilting of the electrode tips could be effected.

U.S. Pat. No. 4,477,712 disclosed a method for seam tracking in a moving arc torch welding operation. The level of infrared radiation in the infrared band having wavelengths greater than 3 microns was determined for at least two points which were equidistant from the welding seam and positioned on opposite sides of the seam ahead of the torch welding direction. Signal information which was indicative of the temperature imbalance across the unjoined seam was generated and used to control the position of the arc torch.

U.S. Pat. No. 4,214,164 disclosed a method and control system for automatically operating a spot welder. Infrared radiation produced during the welding procedure was detected. The actual temperature of the weld was not itself measured but the infrared radiation was proportional to the temperature of the weld. A thermal signal was produced and compared to a value stored in a point set memory. The amount of electrical energy supplied to the spot welder was varied in time and intensity.

U.S. Pat. No. 4,484,059 disclosed an infrared sensor for an electric arc welder. An infrared detector received infrared radiation produced from the welding operation. A filter permitted passage of only infrared radiation having wavelengths greater than about 3 microns. The detector was utilized to obtain weld pool information by detecting infrared radiation emitted from the weld pool having wavelengths greater than 3 microns.

The methods and apparatus disclosed above are concerned only with welding operations. They fail to provide an apparatus or method useful for monitoring a laser process at a location behind of the laser process to automatically monitor the process. Such methods and apparatus have either utilized an AE sensor for laser welds or an infrared radiation sensor for non-laser applications. It would be an advancement in the art to provide a method and apparatus for monitoring a laser process by detecting infrared radiation at a point behind the laser process point. It would be a further advancement to provide a method and apparatus for monitoring laser processes whereby detected infrared radiation is compared to a predetermined signature range and if the detected infrared radiation falls outside the window a laser process station is signalled.

SUMMARY OF THE INVENTION

Accordingly, it is an object of the present invention to overcome the problems recited above.

Another object of the present invention is to provide a method and apparatus for monitoring a laser process.

Yet another object of the present invention is to provide a method and apparatus for detecting infrared radiation in a laser process at a point behind where the laser process is currently operating.

Still a further object of the present invention is to provide a method and apparatus for monitoring a laser process by detecting infrared radiation and comparing the detected radiation to a predetermined acceptable signature range.

Another object of the present invention is to provide a method and apparatus for monitoring a laser process by comparing detected infrared radiation to a predetermined signature range and provide a signal to a laser process station.

Yet another object of the present invention is to provide a method and apparatus for monitoring a laser welding process embodied in a complete welding process station.

Still another object of the present invention is to provide a method and apparatus for monitoring a laser cladding process embodied in a complete cladding process station.

A further object of the present invention is to provide a method and apparatus for monitoring a laser transformation hardening process embodied in a work station.

Another object of the present invention is to provide a method and apparatus for monitoring a laser annealment process embodied in a work station.

The preceding and other objects of the present invention are achieved by providing a method for monitoring a laser process which delivers energy from a laser source to a material along a process path while producing a plasma or flame at a beam delivery point along the path. A window value is determined at which the laser process provides an acceptable energy transfer to the beam delivery point. Infrared radiation is detected along the process path at a point behind of and in close proximity to the beam delivery point. The detected infrared radiation is processed and a process signal produced. The process signal is compared to the window value and a signal is generated when the process signal is not within the range of the window.

In another aspect of the present invention, an apparatus for monitoring a laser process is provided. The apparatus includes a laser source and infrared detection means for receiving infrared radiation at a point behind of and in close proximity to the beam delivery point. The infrared detection means produces electrical signals proportional to the intensity of infrared radiation impinging on the detection means. Comparison means receive the electrical signals and compares them to a predetermined window value. Means operatively associated with the comparison means are provided and signal when the electrical signals are not within the window range.

The present invention provides a method and apparatus for monitoring various laser processes including but not limited to welding, cladding, transformation hardening and annealing. In one embodiment, the laser process is part of the complete work station. Depending on various parameters such as process, materials, conditions and the like, a signature value is determined for a process. Different signature values can be assigned for the same process depending on the parameters. Infrared radiation is detected at a point along a process seam behind where the process is currently practiced. The actual point selected is far enough away from the flame or plasma generated so that interference which results in an uneven non-uniform temperature profile, is established. This same point can not be too far from the plasma or flame because the temperature will be low and other factors will contribute to a non-uniform measurement.

Upper and lower values are established for the signature. An acceptable laser process is confirmed by measuring the infrared radiation, converting it to electrical pulses and comparing it to the predetermined signature. Almost co-incidently acceptable laser processes are produced as well as the determination of a comfortable range of the particular signature.

In one embodiment the laser process is welding. Comparison with the signature range provides information such as position of the laser beam, how well an inert gas shield is working if something is out of position, and the like. It is all temperature dependent and one is able to have consistent control and processed parts are also consistent.

The present invention is applicable to entire work stations where a laser process takes place. It is a real time device which can in certain instances turn the laser off and on. It is not a feedback loop whereby the laser is commanded in order to accomodate changed process parameters. Essentially, it is an apparatus and method which verifies that the process has proceeded according to a predetermined specification. With a total work station if there is a specification fallout, as indicated and determined by the present invention, then it is merely a total machine action rather than a process parameter action.

With the present invention total machine action can vary. If the present invention provides a signal that the process is out of the acceptable signature range only rarely, then it may be appropriate to have the work station discard that particular processed item. Additionally, the present invention can verify if there is a slow deterioration of the process over time, whether the problem may be with the machine tool itself or if it is an upline process problem.

These and other objects, advantages, features and characteristics of the present invention will be apparent from the following description of the preferred embodiments, considered along with the accompanying claims.

DETAILED DESCRIPTION OF THE DRAWINGS

DESCRIPTION OF THE PREFERRED EMBODIMENTS

Figure 1:
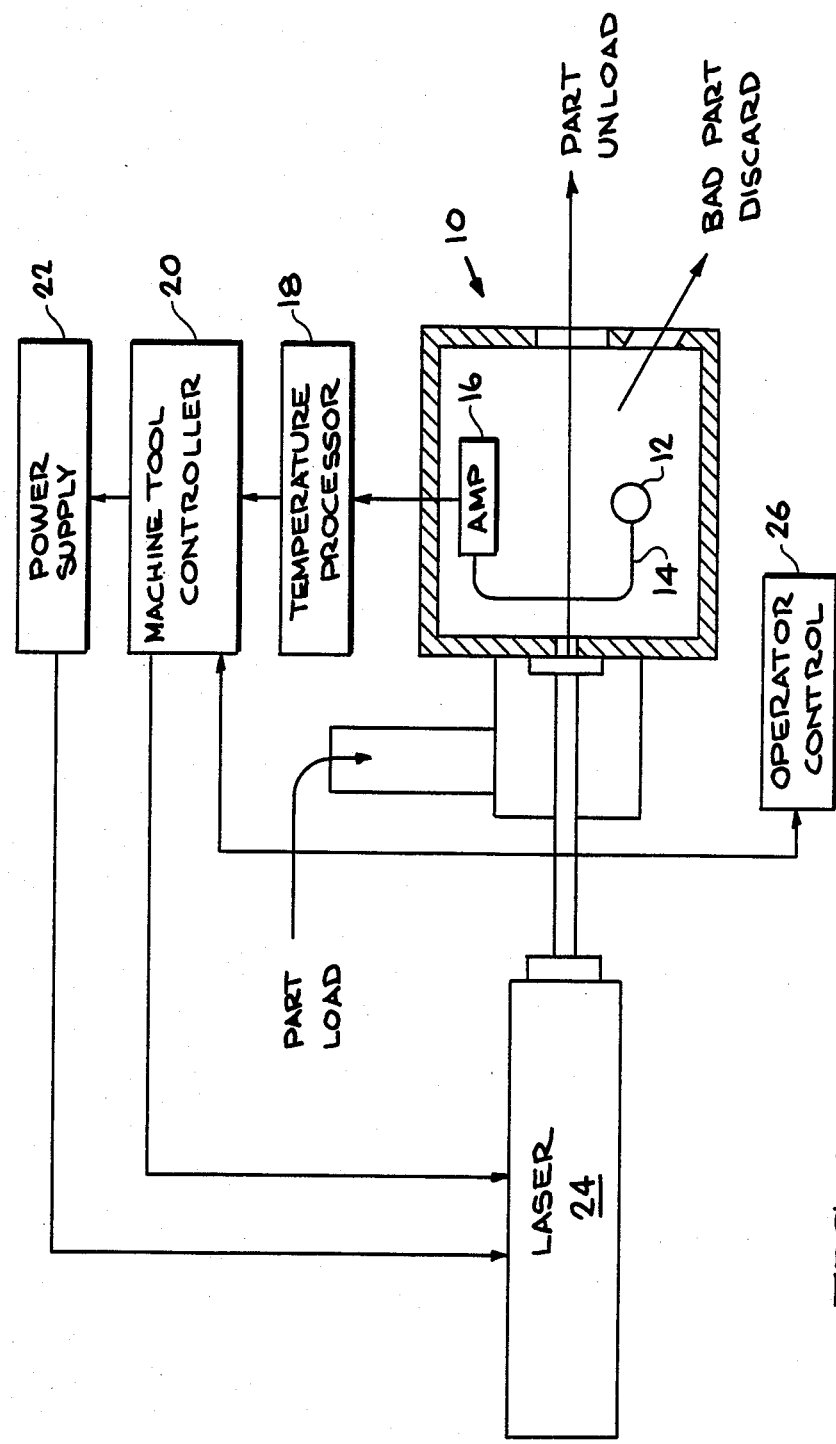
FIG. 1 is a schematic view of one embodiment of the invention illustrating a laser machine tool installation including a sensor head disposed within the work station enclosure with direct view access to the laser process.

The present invention provides a method and apparatus for monitoring a laser process. Energy from a laser source (a laser beam) is delivered to a material such as a work-piece or part, along a process path. A plasma or flame, depending on the laser process, is produced at a beam delivery point along the path. First a window range of temperature, representative of acceptable bounds indicative of whether or not the laser process has produced a good part is determined. This signature essentially is a guide for comparison purposes enabling the establishment of whether or not the laser process has provided an acceptable energy transfer to a beam delivery point along the process path.

Infrared radiation is detected along the process path at a point behind of and in close proximity to the beam delivery point where actual energy is being transferred during the process to the material. The infrared radiation is not detected at the actual beam delivery point on the material where the laser process is actually occurring. It is detected at some point intermediate along the process path, behind the beam delivery point, at a point where at some time previously the laser process has delivered energy from the laser beam. The infrared detector does not look or detect at the flame or at a position where the laser impinges on the work piece.

Nor does it look at reflected infrared energy from the laser. The detection does not occur in the actual action area where the laser is currently delivering energy. It is detected at a distance away from there to the limit of a range of a lower unrealiable basal temperature ranges of the base material where the laser process has not occurred. The actual point where infrared energy is detected is indicative that the laser process is being performed to a predetermined specification.

The point of detection is a point where there is a substantially uniform temperature profile. If the point is too close to the flame or plasma then interference is observed, resulting in a temperature profile which includes spikes extending beyond the signature range. If the detection point is too remote from the flame or plasma then outside variables such as contaminants and the like also result in a non-uniform temperature profile with spikes extending outside the signature range. Additionally, the detection point must be at a point which is still hot enough to be a reliable indicator of the process profile and must not have cooled too much. Essentially, infrared radiation is detected somewhere intermediate between those two points along the process path. Radiation is detected at a process point which has experienced some cooling but yet far enough away from the flame or plasma so a uniform temperature profile (proportional to the level of detected infrared radiation) is observed with minimal temperature spikes observable as a result of being too close or too far from the flame or plasma.

After the infrared radiation is detected it is processed to produce a process signal representative of the level of detected infrared radiation. The process signal is an electrical signal or series of signals which are representative of the temperature profile of the detection point. If the process is laser welding then the point is a somewhat cooled weld pool. The process signal is compared to the window value (non-manually) and a signal is generated if the process signal is outside the window range. Alternatively, a signal is generated only when the process signal falls outside the window range a predetermined number of times. This all depends on the particular laser process, types of material being processed, the reason for monitoring the laser process, the purpose for monitoring the process, and the like.

Different laser processes are suitable with the present invention. Exemplary laser processes include but are not limited to welding, cladding, transformation hardening, annealing and the like.

To best understand how this window value is determined, reference will now be made to a laser welding process. However, it will be appreciated that the window range can be determined for any desired laser process where monitoring is desired and additionally the window range can vary for a particular laser process depending on different parameters including the amount of processing desired, materials selected, processing conditions, and the like.

When beginning to establish a window range for a laser welding process there are some fundamental laser parameters which one would want to duplicate such as weld speed, laser power and focus position. Empirically a plurality of samplings of the laser welding process are taken at different locations along the weld seam (at a distance behind the plasma along the weld seam) and for a number of different work pieces. Infrared radiation is detected at the desired point in the vicinity of the plasma and a temperature reading taken. The part is then cut open and a metallographic section of this process taken which verifies whether or not the weld location and depth of penetration, size and uniformity of the weld are satisfactory. Additionally, a determination is made that there are no other difficulties with the process. During the sampling operation for the purposes of establishing a window range, soundagraphic chart recorders can be utilized to record events. All of these lead to determining the desired or ideal position along the weld seam to take the temperature reading (detect infrared radiation) and also acsertain the upper and lower limits which establish the window range. In this manner the window range and location of the infrared radiation detection point along the weld seam are coincidently ascertained.

It is all temperature dependent. By detecting the infrared radiation emitted by the weld pool its temperature range is profiled. From temperature determination the profile of the process is taken and one then knows whether or not an acceptable laser process has occurred.

Temperature increases developed by the laser beam perform a certain level of work on the work piece. It is the controllability of this laser energy which produces a very specific precise piece of work on a part. The present invention utilizes infrared detection for a dual purpose, consistent control of the laser process, and allows for providing consistency of the work pieces. Essentially a temperature range is determined and when a sampled laser process is out of the temperature range then the laser process is out of the margin which has been built into a total overall system, work station, where appropriate action can be taken.

In FIG. 1, a schematic view of an exemplary total laser process machine tool, work station installation is illustrated and generally denoted as 10. An infrared sensor head 12 is positioned within work station 10 with direct view access to the laser process which work station 10 will perform. Detected infrared radiation is transmitted from sensor head 12 through a fiber optic cable 14 (or other suitable means for transmitting the detected radiation) to an amplifier 16 which translates the detected radiation into an electrical signal proportional to the temperature of the laser process at the point where the infrared radiation is sampled. An exemplary amplifier which can be employed is a Land Instruments model FP12 made by Land Infrared, Limited, Sheffield, England. A temperature processor 18 processes the electrical signal, stores the window range and makes a comparison between the two and provides a means by which a signal can be generated to denote that the window range has been exceeded. An exemplary temperaure processor is a Land Instruments Landmark 4 Special Z1227 made by Land Infrared, Limited, Sheffield, England. The activities of a laser machine tool may be coordinated by a machine tool controller 20. A machine tool controller is chosen from numerous controllers available mainly on the basis of the complexity of the activities that it is required to execute. These are general industrial devises that may be programmed to execute the repeated required functions in the operation of automated machine tools. An exemplary machine tool controller is Allen Bradley model #7100, Milwauke, Wis. In one embodiment if the temperature of the work piece being processed is not within the window zone machine tool controller 20 is signalled to discard the part. Machine tool controller 20 is operatively associated with a part unload mechanism which discards the work piece from work station 10 when a signal is received from machine tool controller 20.

In another embodiment of the present invention if machine tool controller 20 receives three signals that three work pieces have not met the requirements of the window zone then the machine tool controller (operatively associated with a power supply 22 supplying power to laser 24) shuts the entire laser process system down and provides a signal such as a light or an alarm, on an operator control panel 26 to signify that human intervention is required to investigate and verify the cause of process failure.

The present invention can either be an automated or a laboratory type set up. Once a signal has been generated that the profiled temperature measurement (proportional to the level of detected infrared energy) a part discard system can discard the part. In one embodiment the work pieces are gravity fed and a mechanical latch allows the part to fall onto a rotary spindle. After the laser process (welding) is complete and the temperature measured and compared to a signature value, the spindle drops down. Another gate opens and if the profiled temperature is outside the signature value, the work piece is removed from the process work station by mechanical or gravity means.

Alternatively, instead of being rejected the work piece can be mechanically placed back through the work station any number of times before it is discarded. Additionally, work pieces not meeting specification (as determined by a comparison with the signature value) can be marked by a suitable medium within the work station prior to their removal therefrom. Rejected work piece records can be recorded to establish a history and provide an information source for quality control.

An industrial $CO_2$ laser is a devise which generates sufficient laser light to do materials processing. This laser generator consists of a laser head, support equipment, controls and facilities connections which are designed and configured to industrial standards and safety requirements. The raw laser beam is delivered to a process station where it is optically configured to the power density and shape which the process requires. The power output that industrial lasers are found and to which this invention applies range between 300 watts and may exceed 9,000 watts. Exemplary industrial $CO_2$ lasers are Spectra-Physics model 975, 973, 820, 810 of rated output powers of 5,000, 2,500, 1,500 and 600 watts respectively. The laser's power output may be controlled up to these rated limits depending on process requirements.

Figure 2:
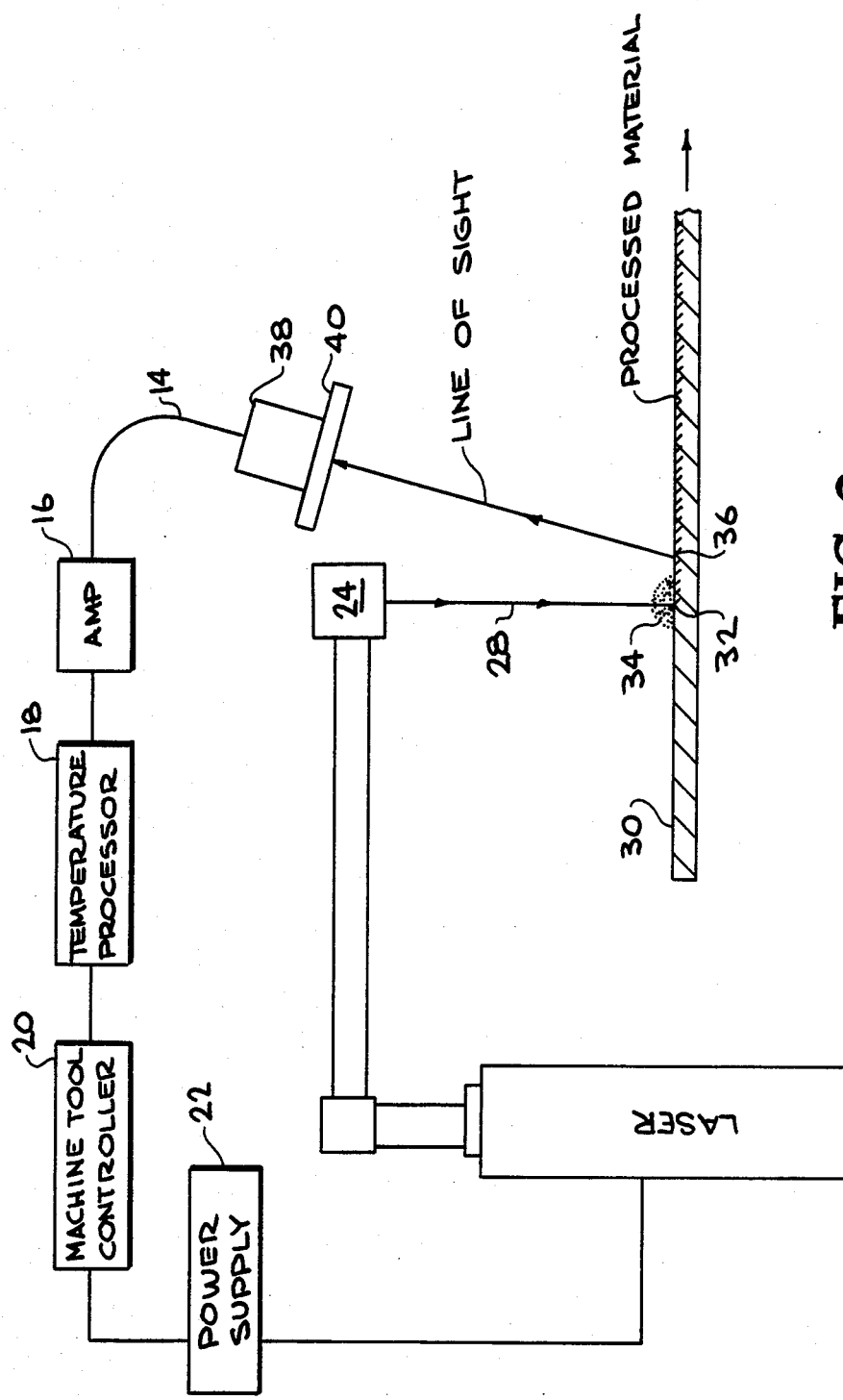
FIG. 2 is a side elevational view of a laser weld process which can be embodied in the laser machine tool installation of FIG. 1.

In FIG. 2 a laser beam 28 is incident upon a work piece 30 at a beam delivery point 32 and produces either a flame or plasma 34, depending on the process. Infrared radiation is detected along a line of sight at a detection point 36 which is positioned along a process path in the vicinity of and behind beam delivery point 32 at a position where the laser processing has already occured.

An infrared radiation sensor 33 is positioned along the line of sight and detects infrared radiation at detection points 36. Different infrared sensors can be employed and an exemplary one is a Land Instruments model FP12-A2 made by Land Infrared, Limited. This consists of a lens and a fiber optic coupler. The lens directs an image onto the fiber optic cable 14. With other available products the lens and amplifier may be one componant without the need of the fiber-optic cable 14.

To protect infrared radiation sensor 38 and provides an effective detection, a sensor protector 40 such as a Land Instruments no. 91,098, Land Infrared, Limited, is used to protect sensor 38 from plasma or flame 34 as well as contaminants. Fiber optic cable 14 connects sensor 38 to amplifier 16 which in turn is operatively associated with suitable electrical connecting means to temperature processor 18 and machine tool controller 20.

Figure 3:
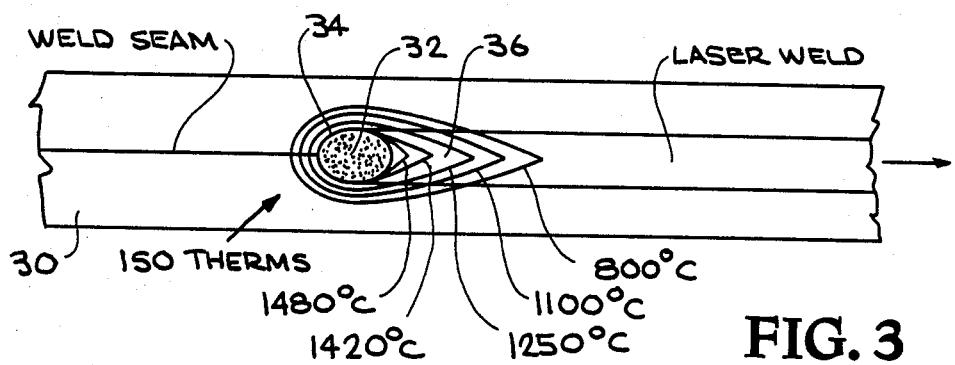
FIG. 3 is a plan top view of the laser weld process of FIG. 2.

FIG. 3 illustrates an embodiment of the invention in which the laser process is a welding process and a plasma 34 is generated. The temperature profile generated around and in the vicinity of plasma 34 is indicated by isotherms. Detection point 36 is positioned along the weld seam at a position apart from plasma 34 and on the laser weld itself. The work piece 30 is moved so the relative position of plasma 34, delivery point 32 and detection point 36 all remain constant. Work piece 30 is moved in a direction away from the laser weld. Detection point 36 is about 0.175 inches from delivery point 32.

Figure 4:
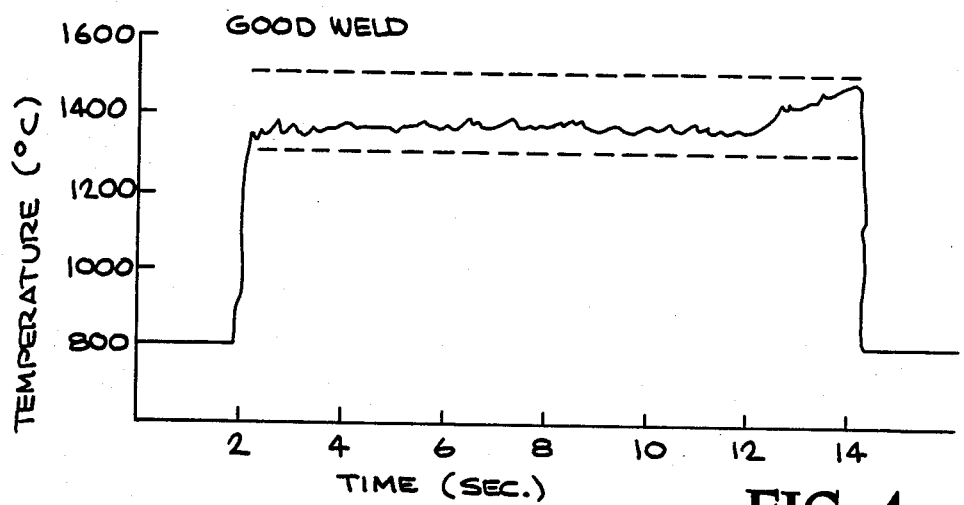
FIG. 4 illustrates in graph form a window value established for one embodiment of a laser process whereby detected temperature in close proximity to the laser process is within the acceptable window range and is indicative that the laser process has met predetermined specifications.

As illustrated in FIG. 4, the output of sensor 38 is traced by a chart recorder and indicates a satisfactory weld. The dotted line depicts the upper and lower boundaries of the predetermined window range.

Figure 5:
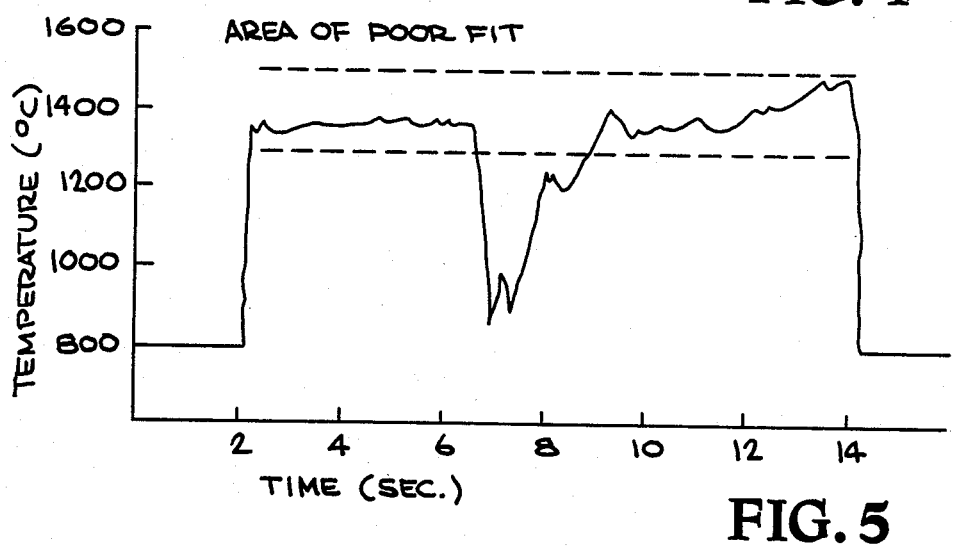
FIG. 5 illustrates in graph form a gap in a weld joint due to lack of material. In this situation the laser beam falls into a void.

In FIG. 5 an unsatisfactory weld is indicated and caused by poor workpiece fit-up. The focussed laser beam has fallen into a void caused by the lack of joint material. The result is a weld of insufficient strength.

Figure 6:
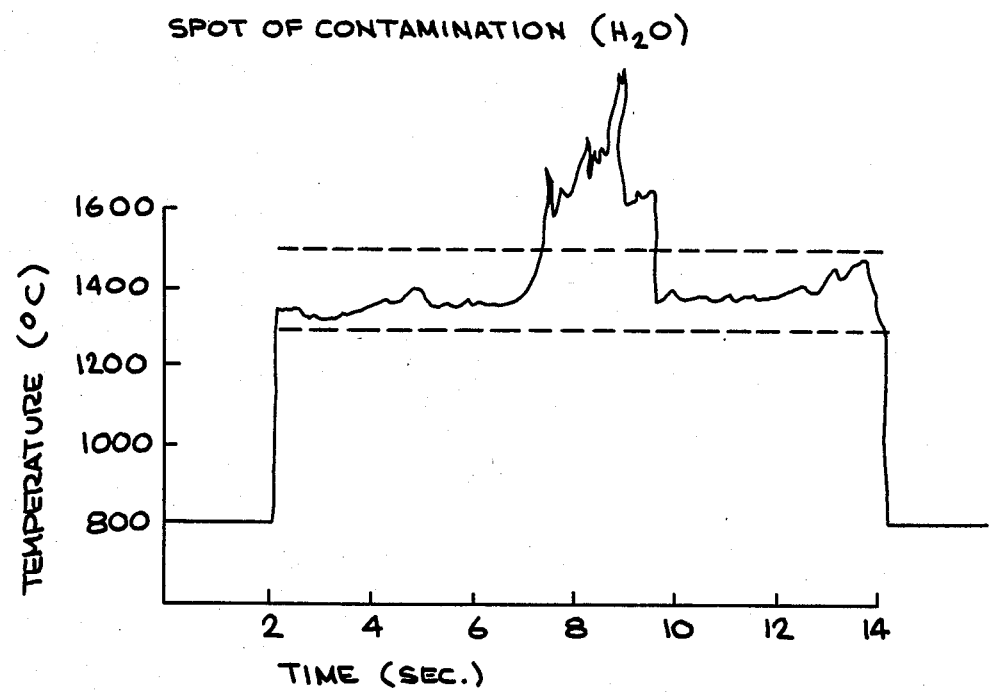
FIG. 6 illustrates in graph form how a contaminate on a weld joint of sufficient size causes the process temperature to fall outside the range.

FIG. 6 shows that contaminants on the weld joint, such as water, can be of a type and quantity to upset the weld integrity.

Figure 7:
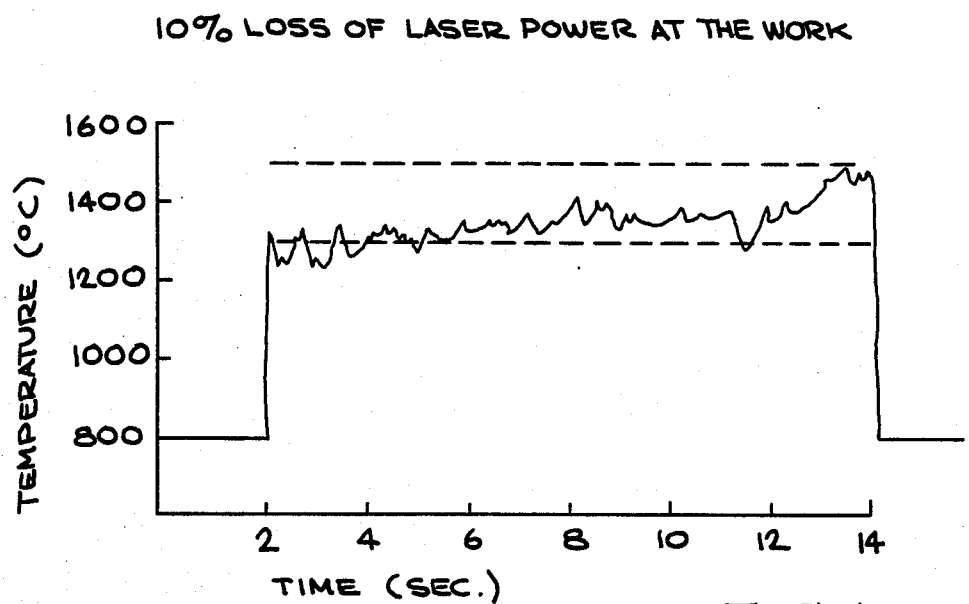
FIG. 7 illustrates in graph form that a reduction of laser power at the laser process site can show as a small but measurable condition which may fall outside the window range.

In FIG. 7 a fault caused by a 10% loss of laser energy at the work surface signals that the weld is of insufficient size.

The following examples are presented for the purpose of illustrating applications of the present invention and are not included to limit the scope of the invention which is set forth in the appended claims.

EXAMPLE 1

Laser Welding

With laser welding a relatively small area of about 0.120 inch diameter is viewed by the infrared radiation detector. Its position is selected for minimal plasma and flame interference at a distance of about 0.175 inch away from the beam delivery point on the work piece. It is noted that circular welds experience a rise at the end due to overlap. Slope is not unusual due to bulk heat up of the work piece. Large slow welds in the range of about 40 IPM with 5 KW have a better tolerance for position than high speed welds of about 110 IPM with 5 KW. Typical weld faults detected are the following: gaps in the weld seam; dirt or contamination; loss of cover gas protection; and loss in power or power density. Power density of about $4 \times 10^6$ KW/in$^2$ is employed and temperatures of about 1400 degrees C. are observed at the detection point.

EXAMPLE 2

Laser Cladding

In cladding processes employing a laser the detection point or area is dependent on power density and the size of the process. Exemplary power densities and cladding areas are about between 940 W/in$^2$ and 28 KW/in$^2$ and 0.250 in diameter respectively. Position of the detection point is chosen to minimize flame and spark interference and is about 0.200 inches away from the flame or spark. Typical cladding faults include the following: loss of cladding material; and large porosity due to loss of power or contamination.

EXAMPLE 3

Laser Transformation Hardening

Like the other processes the detection point is chosen to provide a good temperature profile with minimal flame interference. Generally, tolerance of detection point position is available at distances of about 0.250 inches is suitable. Slope in the temperature profile is observed due to bulk part heating. Typical laser transformation hardening problems include: coating variations; loss of laser power; and cooling water interference.

EXAMPLE 4

Laser Annealment

Laser annealment parameters as applied to the present invention are substantially the same as those for transformation hardening. Problems encountered include coating variations and loss of laser power at the work piece.

EXAMPLE 5

General Laser Processes

The particular laser process and parameters determine the spot area (detection point) which is viewed by the infrared radiation sensor. A lens system chosen for the detection point determines the distance the sensor is from the work piece. The sensor is positioned on a structure which is adjustably mounted for fine tuning of the viewing area. Distances of about 3 to 18 inches are suitable and may be exceeded if required. This distance is chosen with available optic components, view area requirements and work station configuration limitations in mind.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An apparatus for monitoring a laser process which delivers energy from a laser source to a work piece along a process path while producing a plasma or flame at a beam delivery point along said path, comprising:
   a laser source;
   infrared radiation detection means for receiving infrared radiation at a point behind and in close proximity to said beam delivery point, said infrared radiation detection means producing electrical signals responsive to the intensity of infrared radiation impinging on said detection means;
   comparison means receiving said electrical signals representative of said infrared radiation and comparing said signals to a predetermined window value;
   means operatively associated with said comparison means for signalling when said electrical signals are not within said window value; and
   work piece reprocessing means operatively associated with said signalling means for reprocessing said work piece through said apparatus when said electrical signals are not within said window value.

2. The apparatus of claim 1, further comprising work piece reprocessing means operatively associated with said signalling means for marking said work piece when said electrical signals are not within said window value.

3. The apparatus of claim 1, further comprising work piece discard means operatively associated with said signally means for discarding said work piece as a rejected part when said electrical signals are not within said window value.

* * * * *